United States Patent
Ma et al.

(10) Patent No.: US 11,582,368 B2
(45) Date of Patent: Feb. 14, 2023

(54) SIGNAL PROCESSING METHOD AND DEVICE, AND DISPLAY APPARATUS

(71) Applicant: BOE TECHNOLOGY GROUP CO., LTD., Beijing (CN)

(72) Inventors: Xitong Ma, Beijing (CN); Xiaodong Shi, Beijing (CN); Lihua Geng, Beijing (CN); Youxiang Xia, Beijing (CN); Xiao Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 16 days.

(21) Appl. No.: 17/598,952

(22) PCT Filed: Dec. 25, 2020

(86) PCT No.: PCT/CN2020/139193
§ 371 (c)(1),
(2) Date: Sep. 28, 2021

(87) PCT Pub. No.: WO2022/133969
PCT Pub. Date: Jun. 30, 2022

(65) Prior Publication Data
US 2022/0400190 A1 Dec. 15, 2022

(51) Int. Cl.
H04N 5/06 (2006.01)
H04N 5/08 (2006.01)

(52) U.S. Cl.
CPC ............... *H04N 5/06* (2013.01); *H04N 5/08* (2013.01)

(58) Field of Classification Search
CPC ............ H04N 5/08; H04N 5/04; H04N 5/06
USPC ............... 348/500, 521, 540, 547; 375/354
See application file for complete search history.

(56) References Cited

U.S. PATENT DOCUMENTS 5,686,968 A * 11/1997 Ujiie ................. H04N 5/06
348/521

* cited by examiner

Primary Examiner — Sherrie Hsia
(74) Attorney, Agent, or Firm — IP & T Group LLP

(57) ABSTRACT

A signal processing method includes: obtaining a first frame synchronization signal including a plurality of first pulses, a period between a trailing edge of a first pulse and a leading edge of a next first pulse being a first time period, which corresponding to a first integer number of pulses of a first pixel clock signal; generating a synchronization calibration signal including a plurality of second pulses, a trigger edge of each second pulse being at a same time as the trailing edge of the first pulse; and generating a second frame synchronization signal including a plurality of third pulses, a period between the trigger edge of each second pulse and a leading edge of a third pulse closest to the second pulse after the second pulse being a second time period, which corresponding to a first integer number of pulses of the second pixel clock signal.

20 Claims, 10 Drawing Sheets

SIGNAL PROCESSING METHOD AND DEVICE, AND DISPLAY APPARATUS

CROSS-REFERENCE TO RELATED APPLICATIONS

This application is a national phase entry under 35 USC 371 of International Patent Application No. PCT/CN2020/139193, filed on Dec. 25, 2020, which is incorporated herein by reference in its entirety.

TECHNICAL FIELD

The present disclosure relates to the field of display technologies, and in particular, to a signal processing method and device, and a display apparatus.

BACKGROUND

With the popularity of display products, there is an increasing demand for display effects of display products. For example, in a process that a display product displays an image, it is undesirable to derive a new image, so that the image may be restored more realistically.

SUMMARY

In one aspect, a signal processing method is provided. The signal processing method includes: obtaining a first frame synchronization signal including a plurality of first pulses, a period between a trailing edge of a first pulse and a leading edge of a next first pulse being a first time period, and the first time period corresponding to a first integer number of pulses of a first pixel clock signal; generating a synchronization calibration signal including a plurality of second pulses, a trigger edge of each second pulse being at a same time as the trailing edge of the first pulse, the trigger edge of the second pulse being a leading edge or a trailing edge of the second pulse, and a pulse width of the second pulse being equal to a pulse width of the first pixel clock signal or a pulse width of a second pixel clock signal; and generating a second frame synchronization signal including a plurality of third pulses, a period between the trigger edge of each second pulse and a leading edge of a third pulse closest to the second pulse after the second pulse being a second time period, and the second time period corresponding to a first integer number of pulses of the second pixel clock signal.

In some embodiments, generating the second frame synchronization signal, includes: counting a number of pulses of the second pixel clock signal; generating the leading edge of a third pulse in the second frame synchronization signal when the number of pulses of the second pixel clock signal reaches the first integer; and generating a trailing edge of the third pulse in the second frame synchronization signal and returning to count the number of pulses of the second pixel clock signal in response to the trigger edge of the second pulse, before the number of pulses of the second pixel clock signal reaches a second integer; or generating the trailing edge of the third pulse in the second frame synchronization signal and returning to count the number of pulses of the second pixel clock signal in response to a case where the number of pulses of the second pixel clock signal reaches the second integer; and returning to count the number of pulses of the second pixel clock signal in response to the trigger edge of the second pulse.

In some embodiments, generating the synchronization calibration signal, includes: obtaining a first signal, the first signal and the first frame synchronization signal being mutually inverted signals; obtaining a second signal, the second signal delaying one pulse width of the first pixel clock signal or the second pixel clock signal compared to the first frame synchronization signal; and obtaining the synchronization calibration signal according to the first signal and the second signal.

In some embodiments, obtaining the synchronization calibration signal according to the first signal and the second signal, includes: performing logic operation on the first signal and the second signal to obtain the synchronization calibration signal.

In some embodiments, obtaining the first signal includes: inverting the first frame synchronization signal to obtain the first signal.

In some embodiments, a frequency of the second pixel dock signal is substantially equal to a frequency of the first pixel dock signal; and the second frame synchronization signal has one third pulse during a time period of at least one set of second pulses, each set of second pulses being composed of two adjacent second pulses, in the synchronization calibration signal.

In some embodiments, a number of pulses of the second pixel dock signal corresponding to a pulse width of the third pulse is less than or equal to a number of pulses of the first pixel dock signal corresponding to a pulse width of the first pulse.

In some embodiments, N times of a frequency of the first pixel clock signal is substantially equal to a frequency of the second pixel dock signal; and N is an integer greater than 1; and the second frame synchronization signal has N third pulses during a time period of at least one set of second pulses, each set of second pulses being composed of two adjacent second pulses, in the synchronization calibration signal.

In some embodiments, N is 2. The second frame synchronization signal has two third pulses during the time period of at least one set of second pulses, each set of second pulses being composed of two adjacent second pulses, in the synchronization calibration signal. A number of pulses of the second pixel dock signal corresponding to a pulse width of a former one of the two third pulses is equal to a number of pulses of the first pixel clock signal corresponding to a pulse width of the first pulse; and a number of pulses of the second pixel clock signal corresponding to a pulse width of a latter one of the two third pulses is less than or equal to the number of pulses of the first pixel clock signal corresponding to the pulse width of the first pulse.

In some embodiments, obtaining the first frame synchronization signal, includes: obtaining a first video signal including the first frame synchronization signal and video data.

In some embodiments, the signal processing method further includes: writing the video data into a storage device; and reading the video data from the storage device according to the second frame synchronization signal to obtain a second video signal including the second frame synchronization signal and the video data.

In some embodiments, the signal processing method further includes outputting the second video signal.

In some embodiments, the signal processing method further includes: obtaining a first frame rate of the first video signal; and obtaining a range of a second frame rate of a display module; in a case where N times of the first frame rate is within the range of the second frame rate, the second frame synchronization signal has N third pulses during a time period of at least one set of second pulses, each set of second pulses being composed of two adjacent second pulses, in the synchronization calibration signal; and N is an integer greater than 1; and in a case where the first frame rate is within the range of the second frame rate, the second frame synchronization signal has one third pulse during the time period of at least one set of second pulses, each set of second pulses being composed of two adjacent second pulses, in the synchronization calibration signal.

In another aspect, a signal processing device is provided. The signal processing device includes: a signal input unit, a first signal processing unit and a second signal processing unit. The signal input unit is configured to obtain a first frame synchronization signal. The first frame synchronization signal includes a plurality of first pulses, and a period between a trailing edge of a first pulse and a leading edge of a next first pulse is a first time period, and the first time period corresponds to a first integer number of pulses of a first pixel clock signal. The first signal processing unit is configured to generate a synchronization calibration signal. The synchronization calibration signal includes a plurality of second pulses, and a trigger edge of each second pulse is at a same time as the trailing edge of the first pulse; and the trigger edge of the second pulse is a leading edge or a trailing edge of the second pulse, and a pulse width of the second pulse is equal to a pulse width of a first pixel clock signal or a pulse width of a second pixel clock signal. The second signal processing unit is configured to generate a second frame synchronization signal. The second frame synchronization signal includes a plurality of third pulses; and a period between the trigger edge of each second pulse and a leading edge of a third pulse closest to the second pulse after the second pulse is a second time period, and the second time period corresponds to a first integer number of pulses of the second pixel clock signal.

In some embodiments, the signal input unit is configured to obtain a first video signal including the first frame synchronization signal and video data.

In some embodiments, the signal processing device further includes: a data writing unit, a data reading unit, and a signal output unit. The data writing unit is configured to write the video data in the first video signal into a storage device. The data reading unit is configured to read the video data in the storage device according to the second frame synchronization signal. The signal output unit is configured to output a second video signal including the second frame synchronization signal and the video data.

In yet another aspect, a signal processing device is provided. The signal processing device includes a memory and a processor. One or more computer programs are stored in the memory. The processor is coupled to the memory; and the processor is configured to execute the computer program, so that the processor implements the signal processing method as described in any of the above embodiments.

In yet another aspect, a signal processing device is provided. The signal processing device is a chip. The chip is configured to implement the signal processing method described in any of the above embodiments.

In yet another aspect, a display apparatus is provided. The display apparatus includes a display module and the signal processing device as described in any of the above embodiments. The signal processing device is coupled to the display module; and the signal processing device is configured to output a second video signal to the display module.

In some embodiments, the display apparatus further includes a storage device. The storage device is coupled to the signal processing device. The storage device is configured to store video data in a first video signal.

In yet another aspect, a non-transitory computer-readable storage medium is provided. The non-transitory computer-readable storage medium stores computer program instructions, and the computer program causes the processor to implement the signal processing method as described in any of the above embodiments when the computer is running.

In yet another aspect, a computer program product is provided. The computer program product includes computer program instructions that, when run on a computer, cause the computer to execute the signal processing method as described in any of the above embodiments.

In yet another aspect, a computer program is provided. When executed on a computer, the computer program causes the computer to execute the signal processing method as described in any of the above embodiments.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual dimensions of products, actual processes of methods and actual timings of signals involved in the embodiments of the present disclosure.

DETAILED DESCRIPTION

Figure 1:
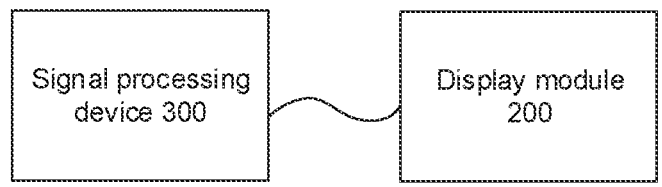
FIG. 1 is a structural diagram of a display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a/the plurality of" means two or more unless otherwise specified.

In the description of some embodiments, terms "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

As used herein, depending on the context, the term "if" is optionally construed as "when" or "in a case where" or "in response to determining" or "in response to detecting". Similarly, depending on the context, the phrase "if it is determined" or "if [a stated condition or event] is detected" is optionally construed as "in a case where it is determined" or "in response to determining" or "in a case where [the stated condition or event] is detected" or "in response to detecting [the stated condition or event]".

The use of the phrase "applicable to" or "configured to" herein means an open and inclusive expression, which does not exclude devices that are applicable to or configured to perform additional tasks or steps.

The term "substantially", "about" or "approximately" as used herein includes a stated value and an average value within an acceptable range of deviation of a particular value. The acceptable range of deviation is determined by a person of ordinary skill in the art in view of the measurement in question and the error associated with a particular amount of measurement (i.e., the limitations of the measurement system).

Embodiments of the present disclosure provide a display apparatus. For example, the display apparatus may be any apparatus that displays an image whether in motion (e.g., a video) or stationary (e.g., a static image), and regardless of literal or graphical. For example, the display apparatus may be one of a variety of electronic apparatuses, and the described embodiments may be implemented in or associated with the variety of electronic apparatuses, such as (but are not limited to) mobile phones, wireless devices, personal data assistants (PADs), hand-held or portable computers, global positioning system (GPS) receivers/navigators, cameras, MPEG-4 Part 14 (MP4) video players, video cameras, game consoles, watches, clocks, calculators, TV monitors, flat-panel displays, computer monitors, car displays (e.g., odometer displays), navigators, cockpit controllers and/or displays, camera view displays (e.g., displays for rear view camera in vehicles), electronic photos, electronic billboards or signages, projectors, architectural structures, and packaging and aesthetic structures (such as a display for an image of a piece of jewelry), etc. The embodiments of the present disclosure do not particularly limit a specific form of the display apparatus.

In some embodiments, as shown in FIG. 1, the display apparatus 100 includes a display module 200 and a signal processing device 300. The display module 200 is coupled to the signal processing device 300.

Figure 2:
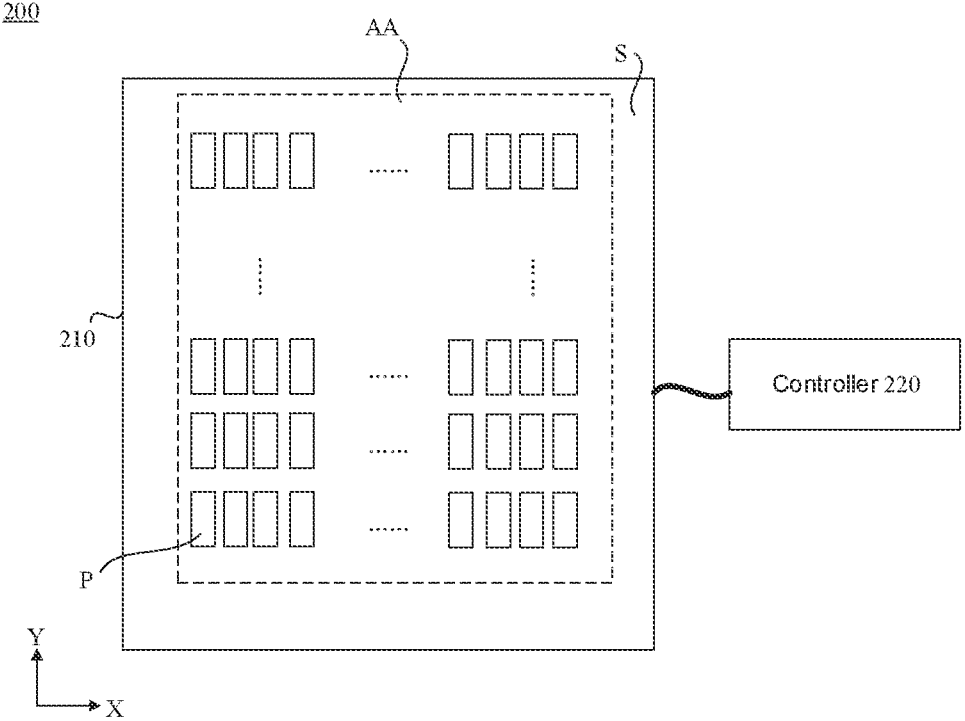
FIG. 2 is a structural diagram of a display module, in accordance with some embodiments.

For example, as shown in FIG. 2, the display module 200 includes a display panel 210. For example, the display panel may be a liquid crystal display (LCD) panel; or a self-emitting display panel, such as a display panel based on organic light-emitting diodes (OLEDs), or a display panel based on light-emitting diodes (LEDs), etc. For example, if the display panel is the LCD panel, the display module further includes a backlight module.

For example, as shown in FIG. 2, the display panel 210 has a display area (i.e., an active area (AA)) and a peripheral area S. The peripheral area S is located on at least one side of the AA. The display panel 200 includes a plurality of pixels P disposed in the AA. For example, the plurality of pixels P may be arranged in an array. For example, pixels arranged in a line along an X direction (a horizontal direction) in FIG. 2 are referred to as a row of pixels, and pixels arranged in a line along a Y direction (a vertical direction) in FIG. 2 are referred to as a column of pixels. For example, each pixel includes sub-pixels, and the sub-pixels include a sub-pixel of a first color, a sub-pixel of a second color and a sub-pixel of a third color. For example, the first color, the second color and the third color are three primary colors. For example, the first color, the second color and the third color are red, green and blue, respectively. That is, the sub-pixels include a red sub-pixel, a green sub-pixel and a blue sub-pixel.

The signal processing device is configured to receive a first video signal and output a second video signal. The display module is configured to display an image corresponding to the second video signal according to the second video signal from the signal processing device.

For example, the display apparatus have a video signal input interface to receive video signals. For example, the video signal input interface may include a serial digital interface (SDI), a high definition multimedia interface (HDMI), or a display port (DP). For example, the video signal input interface may be included in the signal processing device. The signal processing device further includes a video signal multiplexer (MUX). The video signal multiplexer is configured to select a video signal from a plurality of video signals input to the video signal multiplexer to be output from the video signal multiplexer. The video signal output from the video signal multiplexer may be used as the first video signal in the context.

For example, the video signal includes a timing signal and video data. The timing signal includes synchronization signals and an enable signal (i.e., a valid data strobe signal or a data enable signal). The synchronization signals include a horizontal synchronization signal and a frame synchronization signal (i.e., a vertical synchronization signal). For example, the first video signal includes a first timing signal and video data, the first timing signal includes first synchronization signals and a first enable signal, and the first synchronization signals include a first frame synchronization signal and a first horizontal synchronization signal. The second video signal includes a second timing signal and video data, the second timing signal includes second synchronization signals and a second enable signal, and the second synchronization signals includes a second frame synchronization signal and a second horizontal synchronization signal.

The horizontal synchronization signal generally selects an effective row signal interval on the display panel, and the frame synchronization signal generally selects an effective vertical signal interval on the display panel. For example, under a combined action of the horizontal synchronization signal and the frame synchronization signal, an interval of effective video data corresponding to the display panel may be selected.

It will be understood that, in the video signal, the valid video data (valid RGB data) only occupies a portion of a video signal cycle, and horizontal blanking and vertical blanking periods of the video signal do not contain the valid video data. Therefore, when relevant circuits in the display apparatus process the video signal, an interval containing the valid video data may be distinguished from a blanking interval not containing the valid video data through the enable signal. Either the horizontal synchronization signal or the frame synchronization signal should be matched with the enable signal. For example, in a process that the horizontal synchronization signal acts on pixels, e.g., in a process that the horizontal synchronization signal drives pixel circuits in the pixels, a portion of the enable signal corresponding to the horizontal synchronization signal is matched with the horizontal synchronization signal; in a process that the frame synchronization signal acts on pixels, e.g., in a process that the frame synchronization signal drives pixel circuits in the pixels, a portion of the enable signal corresponding to the frame synchronization signal is matched with the frame synchronization signal, so as to ensure that the display panel may effectively display an image corresponding to the video signal.

For example, as shown in FIG. 2, the display module 200 further includes a controller 220. The controller may be a timing controller (TCON). The controller 220 is coupled to the display panel 210. The controller is configured to receive the second video signal from the signal processing device and control the display panel to display an image corresponding to the second video signal. For example, the display module further includes driver chip(s). The driver chip(s) are bonded to the display panel, and coupled to the controller. In this case, the signal processing device transmits the second video signal to the controller, and the controller outputs a control signal to the driver chip, and the driver chip outputs a driving signal to the display panel according to the control signal, so as to drive the display panel to display an image corresponding to the video data in the second video signal.

Figure 3:
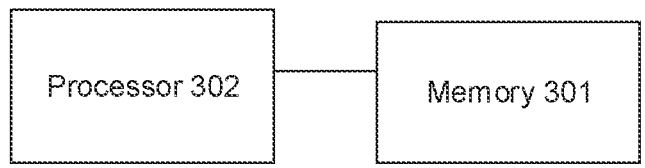
FIG. 3 is a structural diagram of a signal processing device, in accordance with some embodiments.

Embodiments of the present disclosure provide a signal processing device. As shown in FIG. 3, the signal processing device 300 includes a memory 301 and a processor 302. The memory 301 is coupled to the processor 302.

The memory 301 has stored therein one or more computer programs that may be run on the processor 302. When the processor 302 executes the computer program, the computer program causes the processor 302 to implement a signal processing method as described in any of the following embodiments.

For example, the processor 302 may be a single processor, or may be a generic term for a plurality of processing elements. The processor 302 may be a general-purpose central processing unit (CPU), a microprocessor, an application specific integrated circuit (ASIC), or one or more integrated circuits for controlling execution of programs of the solutions of the embodiments of the present disclosure, such as one or more microprocessors. For example, the memory 301 may be a single memory, or a generic term for a plurality of storage elements, and is used to store executable program codes or the like. Moreover, the memory 301 may be a random access memory (RAM) or a non-volatile memory, such as a disk memory, a flash memory, etc.

The memory 301 is used for storing application program codes for executing the solutions of the embodiments of the present disclosure, and the execution is performed by the processor 302. The processor 302 is used to execute the application program codes stored in the memory 301 to implement the signal processing method as described in any of the following embodiments of the present disclosure.

Figure 4:
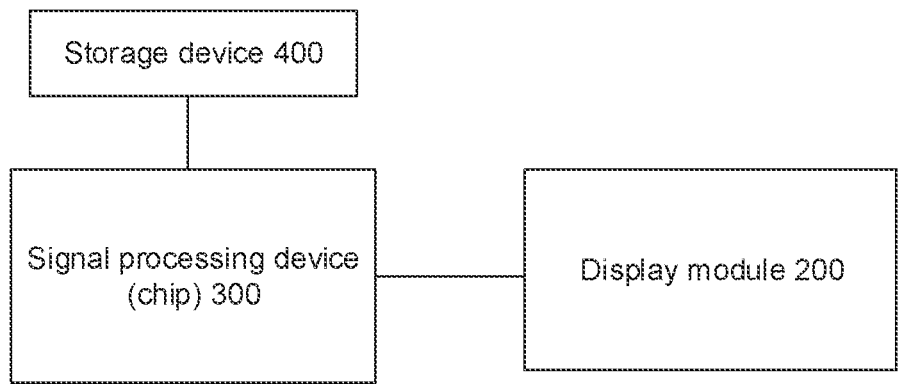
FIG. 4 is a structural diagram of another display apparatus, in accordance with some embodiments.

Embodiments of the present disclosure provide a signal processing device. As shown in FIG. 4, the signal processing device 300 may be a chip. The chip is configured to implement a signal processing method as described in any of the following embodiments. For example, the chip may be a programmable device, such as a complex programmable logic device (CPLD), an erasable programmable logic device (EPLD) or a field programmable gate array (FPGA).

In some embodiments, as shown in FIG. 4, the display apparatus 100 further includes a storage device 400. The storage device 400 is coupled to the signal processing device 300. The storage device 400 is configured to store the video data in the first video signal. For example, the storage device 400 may be located in the signal processing device 300. For example, the storage device may be a random access memory or a double data rate synchronous dynamic random access memory (DDR SRAM), such as a DDR3.

Figure 5:
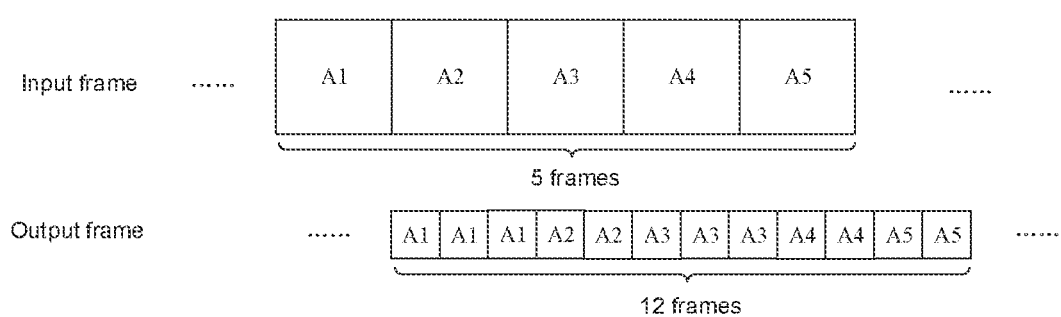
FIG. 5 is a diagram showing a transmission process of a video signal in a signal processing method, in accordance with some embodiments.

In the related art, a frame rate of a video signal received by a signal processing device in a display apparatus is not matched with a frame rate of a video signal that may be normally displayed by a display module in the display apparatus. For example, the frame rate of the video signal received by the signal processing device is 25 Hz, and the frame rate of the video signal that may be normally displayed by the display module is 60 Hz. In this case, the signal processing device receives 5 frames of video signals (e.g., referring to input frames A1, A2, A3, A4 and A5 in FIG. 5), and the signal processing device outputs 12 frames of video signals (e.g., referring to output frames A1, A1, A1, A2, A2, A3, A3, A3, A4, A4, A5 and A5 in FIG. 5) to the display module. In the 12 frames of the video signals output by the signal processing device, part of the input video signals (A1 and A3) are output after copying 3 times, and part of the input video signals (A2, A4 and A5) are output after copying 2 times. In this case, the input video signals and the output video signals of the signal processing device are not synchronized. That is, the input frames and the output frames of the signal processing device are not synchronized, and copying of the output frames to the input frames is uniform. For example, part of the input frames may correspond to three output frames, part of the input frames may correspond to two output frames, which may easily cause frame skipping or frames missing of display, and reduce a display effect. For example, a display apparatus with high requirements for displaying images, such as a monitor, may reduce an authenticity of a display.

Embodiments of the present disclosure provide a signal processing method. For example, the signal processing method is applied to a signal processing device, such as the signal processing device 300 in FIGS. 1, 3 and 4. The signal processing method includes S10 to S30.

Figure 6A:
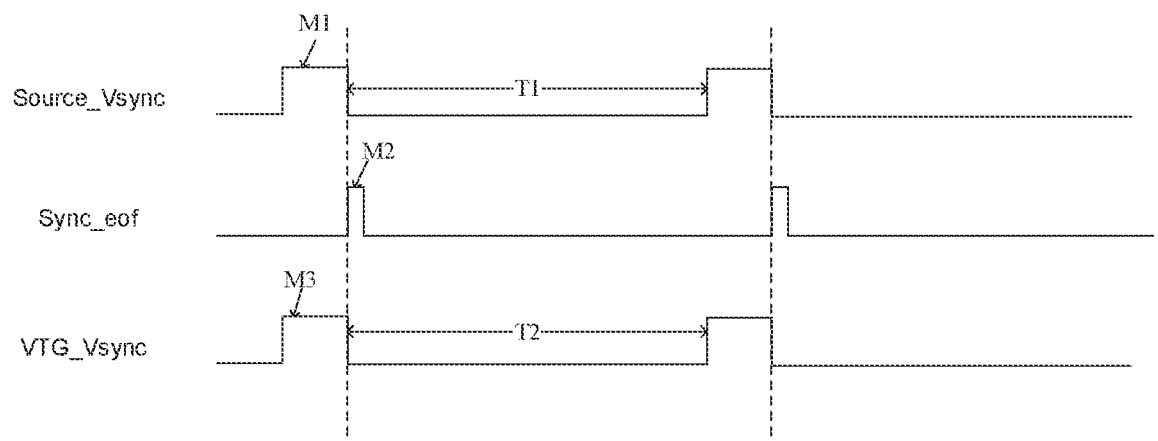
FIG. 6A is a signal timing diagram of a signal processing method, in accordance with some embodiments.
Figure 7A:
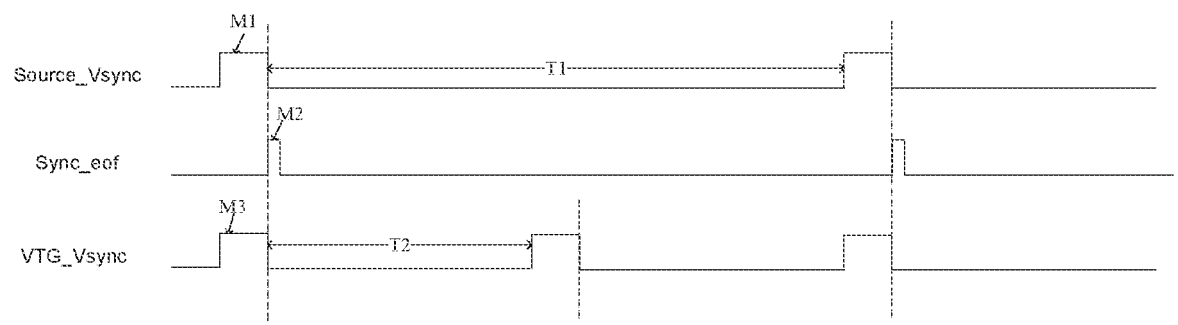
FIG. 7A is another signal timing diagram of a signal processing method, in accordance with some embodiments.

In S10, a first frame synchronization signal is obtained. Referring to FIGS. 6A and 7A, the first frame synchronization signal Source_Vsync includes a plurality of first pulses M1. A period between a trailing edge of a first pulse and a leading edge of a next first pulse is a first time period T1. The first time period corresponds to a first integer number of pulses of a first pixel clock signal.

For example, obtaining the first frame synchronization signal includes: obtaining a first video signal. The first video signal includes the first frame synchronization signal and video data. It will be understood that the video data include pixel data, such as display gray scales of sub-pixels in the display module.

Figure 8:
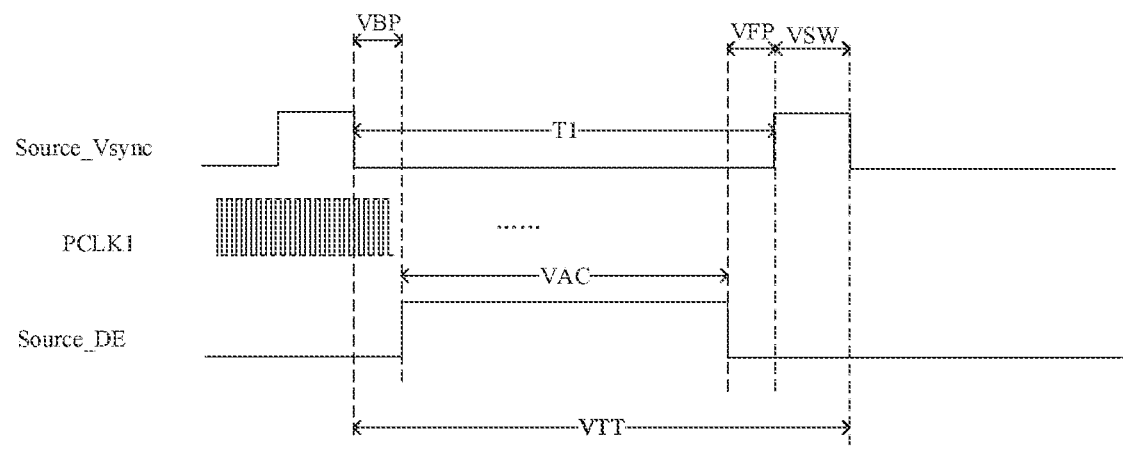
FIG. 8 is yet another signal timing diagram of a signal processing method, in accordance with some embodiments.

The number of pulses of the first pixel clock signal corresponding to the first time period between the trailing edge (i.e., a falling edge) of the first pulse and the leading edge (i.e., a rising edge) of the next first pulse in the first frame synchronization signal is the first integer and during the first time period between the trailing edge (i.e., the falling edge) of the first pulse and the leading edge (i.e., the rising edge) of the next first pulse in the first frame synchronization signal, the number of clock cycles of the first pixel clock signal is the first integer. For example, the clock cycle may be understood as a period between a leading edge (or a trailing edge) of a pulse and a leading edge (or a trailing edge) of a next pulse. For example, referring to FIG. 8, the first video signal further includes a first enable signal Source_DE. The first integer is (VBP+VAC+VFP), where VBP represents the number of pulses of the first pixel clock signal (PCLK1) between a trailing edge of a first pulse in the first frame synchronization signal and a leading edge of a pulse of the first enable signal Source_DE (a leading edge of valid video data), VAC represents the total number of rows of pixels in the display module, and VFP represents the number of pulses of the first pixel clock signal between a leading edge of a next first pulse in the first frame synchronization signal and a trailing edge of the first enable signal Source_DE (a trailing edge of the valid video data). For example, a resolution of the display module is 1920×1080, VBP is 36, VFP is 4, and VAC is 1080.

The first pixel clock signal may be obtained according to the first frame synchronization signal, the first horizontal synchronization signal and the first enable signal in the first video signal. A frequency of the first pixel clock signal is related to a first frame rate of the first video signal. For example, the frequency of the first pixel clock signal is a product of the first frame rate of the first video signal, HTT and VTT, where HTT represents the total number of pixel clock cycles of a row of pixels, and VTT represents the total number of HTT within one frame. For example, the resolution of the display module is 1920×1080; in a case where the first frame rate of the first video signal is 60 Hz, HTT is 2200, and VTT is 1125, the frequency of the first pixel clock signal is 148.5 MHz; in a case where the first frame rate of the first video signal is 30 Hz, HTT is 2200, and VTT is 1125, the frequency of the first pixel clock signal is 74.5 MHz; in a case where the first frame rate of the first video signal is 50 Hz, HTT is 2640, and VTT is 1125, the frequency of the first pixel clock signal is 148.5 MHz; in a case where the first frame rate of the first video signal is 25 Hz, HTT is 2640, and VTT is 1125, the frequency of the first pixel clock signal is 74.5 MHz; in a case where the first frame rate of the first video signal is 48 Hz, HTT is 2570, and VTT is 1125, the frequency of the first pixel clock signal is 148.5 MHz; in a case where the first frame rate of the first video signal is 24 Hz, HTT is 2750, and VTT is 1125, the frequency of the first pixel clock signal is 74.5 MHz. A pulse width of the first pulse of the first frame synchronization signal is VSW. That is, VSW is an effective width of the first frame synchronization signal. For example, the resolution of the display module is 1920×1080, and VSW is 5.

Figure 13:
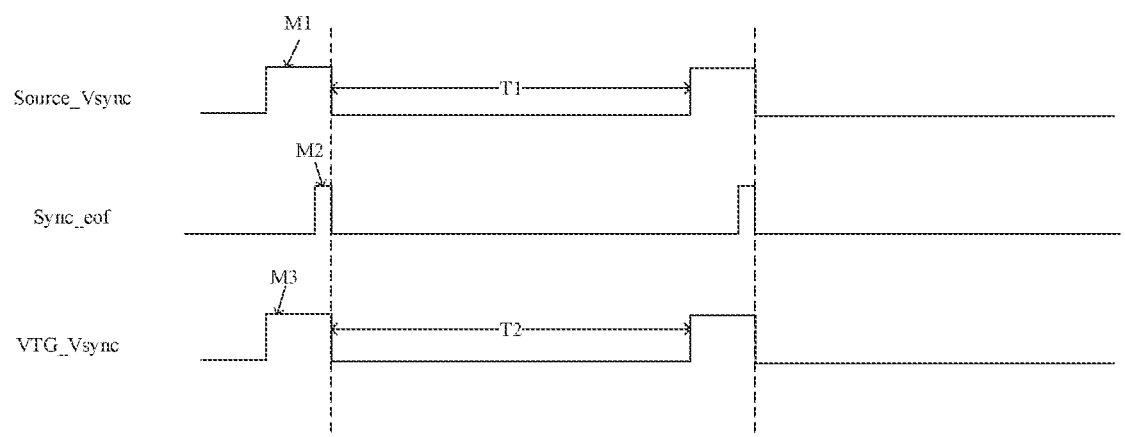
FIG. 13 is yet another signal timing diagram of a signal processing method, in accordance with some embodiments.

In S20, a synchronization calibration signal is generated. Referring to FIGS. 6A, 7A and 13, the synchronization calibration signal Sync_eof includes a plurality of second pulses M2. A trigger edge of each second pulse is at a same time as the trailing edge of the first pulse. The trigger edge of the second pulse is a leading edge (referring to FIGS. 6A and 7A) or a trailing edge (referring to FIG. 13) of the second pulse, and a pulse width of the second pulse is equal to a pulse width of the first pixel clock signal or a pulse width of a second pixel clock signal.

A frequency of the second pixel clock signal may be obtained according to a second frame rate of the display module. For example, the frequency of the second pixel dock signal is a product of the second frame rate of the display module, HTT and VTT. For example, a range of the second frame rate of the display module may be about 40 Hz to about 70 Hz. For example, the second frame rate is 48 Hz, 50 Hz, 60 Hz, or the like.

For example, generating the synchronization calibration signal includes S21 to S23.

Figure 11:
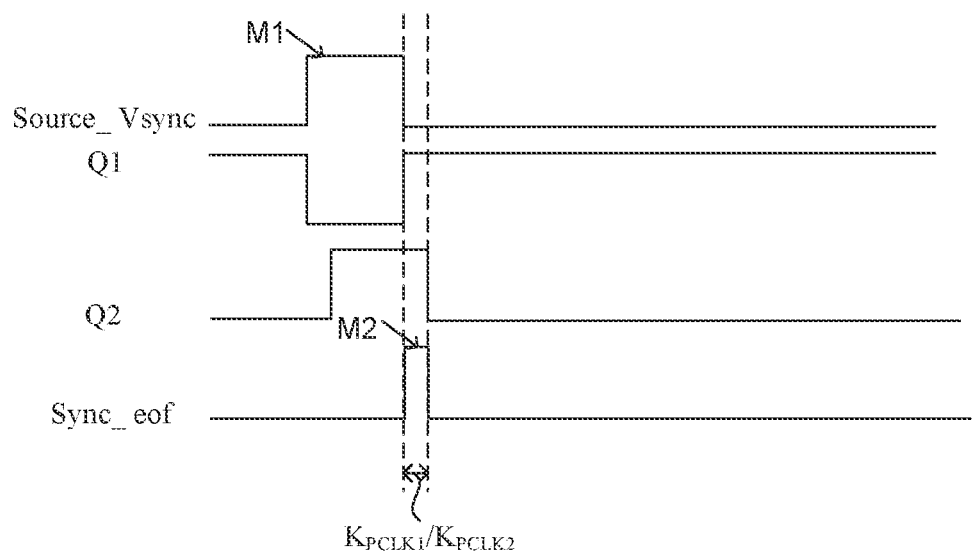
FIG. 11 is yet another signal timing diagram of a signal processing method, in accordance with some embodiments.

In S21, a first signal is obtained. Referring to FIG. 11, the first signal Q1 and the first frame synchronization signal Source_Vsync are mutually inverted signals. It will be understood that a phase of the first signal and a phase of the first frame synchronization signal differ by 180 degrees.

For example, obtaining the first signal includes: inverting the first frame synchronization signal to obtain the first signal. For example, an inverter may be used to invert the first frame synchronization signal. For example, the inverter is included in the signal processing device.

For another example, obtaining the first signal includes: obtaining the first signal after registering the first frame synchronization signal for a preset period. For example, the first frame synchronization signal may be registered by a register for the preset period to obtain the first signal, and the preset period may be a period required to delay the phase of the first frame synchronization signal by 180 degrees. For example, the register is included in the signal processing device.

In S22, a second signal is obtained. Referring to FIG. 11, the second signal Q2 delays one pulse width of the first pixel clock signal or the second pixel clock signal compared to the first frame synchronization signal Source_Vsync. That is, the second signal Q2 delays one pulse width $K_{PCLK1}$ of the first pixel clock signal compared to the first frame synchronization signal Source_Vsync, or the second signal Q2 delays one pulse width $K_{PCLK2}$ of the second pixel clock signal compared to the first frame synchronization signal Source_Vsync.

For example, the first frame synchronization signal may be registered with one pulse width of the first pixel clock signal or the second pixel clock signal to obtain the second signal.

In S23, the synchronization calibration signal is obtained according to the first signal and the second signal.

For example, obtaining the synchronization calibration signal Sync_eof according to the first signal and the second signal includes: performing logic operation on the first signal and the second signal to obtain the synchronization calibration signal. For example, after the first signal and the second signal pass through a logic circuit, an output signal is the synchronization calibration signal. The logic circuit may be included in the signal processing device. For example, the logic operation may be an AND operation, and the logic circuit may be an AND gate. After the first signal and the second signal pass through the AND gate, the output signal is the synchronization calibration signal. The AND gate may be included in the signal processing device.

In this case, referring to FIG. 11, the leading edge of the second pulse M2 in the synchronization calibration signal Sync_eof is at the same time as the trailing edge of the first pulse M1 in the first frame synchronization signal Source_Vsync, and the leading edge of the second pulse M2 serves as the trigger edge of the second pulse. In addition, a case where the trailing edge of the second pulse serves as the trigger edge of the second pulse may be designed according to actual situations with reference to FIG. 13, which is not limited herein.

In S30, a second frame synchronization signal VTG_Vsync is generated. Referring to FIGS. 6A and 7A, the second frame synchronization signal includes a plurality of third pulses M3. A period between the trigger edge (e.g., the leading edge) of each second pulse M2 and a leading edge of a third pulse M3 closest to the second pulse M2 after the second pulse M2 is a second time period T2, and the second time period corresponds to a first integer number of pulses of the second pixel clock signal.

For example, generating the second frame synchronization signal includes:

counting the number of pulses of the second pixel clock signal;

generating a leading edge of a third pulse in the second frame synchronization signal when the number of pulses of the second pixel clock signal reaches the first integer; and generating a trailing edge of the third pulse in the second frame synchronization signal and returning to count the number of pulses of the second pixel clock signal in response to the trigger edge of the second pulse, before the number of pulses of the second pixel clock signal reaches a second integer; or generating the trailing edge of the third pulse in the second frame synchronization signal and returning to count the number of pulses of the second pixel clock signal in response to a case where the number of pulses of the second pixel clock signal reaches the second integer; and returning to count the number of pulses of the second pixel clock signal in response to the trigger edge of the second pulse.

For example, at a moment of a trigger edge of a second pulse in the synchronization calibration signal, values of a row counter r_PCNT and a column counter r_LCNT are both in an initialized state. For example, at the moment of the trigger edge of the second pulse in the synchronization calibration signal, values of the row counter r_PCNT and the column counter r_LCNT are both 0. The number of pulses of the second pixel clock signal is counted, for example, the number of pulses of the second pixel clock signal may be counted from the moment when the values of the row counter r_PCNT and the column counter r_LCNT are both in the initialized state. Each time a pulse of the second pixel clock signal is passed, a value of the row counter r_PCNT is increased by one. Each time the value of the row counter r_PCNT reaches a first parameter (for example, the first parameter is HTT), the value of the row counter r_PCNT is returned to an initialized value, and a value of the column counter r_LCNT is increased by one. The value of the row counter r_PCNT is recounted from the initialized value from a moment when the value of the row counter r_PCNT reaches the HTT.

In a case where the value of the column counter r_LCNT reaches a second parameter (for example, the second parameter is (VBP+VAC+VFP)), the number of pulses of the second pixel clock signal reaches the first integer, and the leading edge of the third pulse in the second frame synchronization signal is generated. The first integer is a product of the first parameter and the second parameter, e.g., the first integer is HTT×(VBP+VAC+VFP).

In a case where the value of the column counter r_LCNT reaches a third parameter (for example, the third parameter is (VBP+VAC+VFP+VSW)), the number of pulses of the second pixel clock signal reaches the second integer, and the trailing edge of the third pulse in the second frame synchronization signal is generated. The second integer is a product of the first parameter and the third parameter, e.g., the second integer is HTT×(VBP+VAC+VFP+VSW).

In a case where the value of the column counter r_LCNT does not reach the third parameter, the number of pulses of the second pixel clock signal does not reach the second integer, and at the moment of the trigger edge of the second pulse, the trailing edge of the third pulse in the second frame synchronization signal is generated, and the values of the row counter r_PCNT and the column counter r_LCNT are both reset to the initialized state. From the moment of the trigger edge of the second pulse, the number of pulses of the second pixel clock signal is recounted.

It will be noted that, two counters are used to count the number of pulses of the second pixel clock signal in the above, but the number of counters is not limited thereto, and may be designed according to actual conditions. For example, one counter may be used to count the number of pulses of the second pixel clock signal.

For example, the signal processing method further includes: while generating the trailing edge of the third pulse in the second frame synchronization signal, returning to count the number of pulses of the second pixel clock signal in response to the case where the number of pulses of the second pixel clock signal reaches the second integer.

For example, in the case where the value of the column counter r_LCNT reaches the third parameter, the number of pulses of the second pixel clock signal reaches the second integer, and the trailing edge of the third pulse in the second frame synchronization signal is generated. Simultaneously, the values of the row counter r_PCNT and the column counter r_LCNT are both reset to the initialized state, and the number of pulses of the second pixel clock signal is recounted when the number of pulses of the second pixel clock signal reaches the second integer.

It will be understood that, compared to a moment when the number of pulses of the second pixel clock signal reaches the second integer, the values of the row counter r_PCNT and the column counter r_LCNT are preferentially initialized at the moment of the trigger edge of the second pulse.

It will be noted that the number of pulses of the second pixel clock signal reaching the second integer refers to a number of pulses of the second pixel clock signal reaching the second integer within a statistical cycle, and the statistical cycle may be a time period from the moment at which the trigger edge of the second pulse of the synchronous calibration signal is located to the moment when the number of pulses of the second pixel clock signal reaches the VTT.

In some embodiments, the frequency of the second pixel clock signal is substantially equal to the frequency of the first pixel clock signal, which may be understood as a ratio of the frequency of the second pixel clock signal to the frequency of the first pixel clock signal is within a range of a first threshold. For example, the range of the first threshold is 0.9 to 1.1, and the first threshold may be 0.999, 1 or 1.001. For example, the frequency of the first pixel clock signal is about 148.5 MHz, and the frequency of the second pixel clock signal is about 148.5 Hz. For example, the first frame rate of the first video signal is about 48 Hz, and the second frame rate corresponding to the display module is about 48 Hz; or the first frame rate of the first video signal is about 50 Hz, and the second frame rate corresponding to the display module is about 50 Hz; or the first frame rate of the first video signal is about 60 Hz, and the second frame rate corresponding to the display module is about 60 Hz.

Figure 6B:
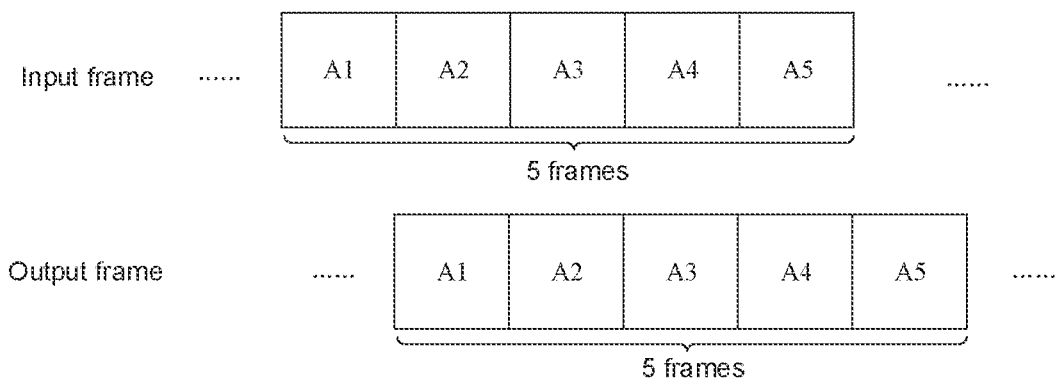
FIG. 6B is a diagram showing another transmission process of a video signal in a signal processing method, in accordance with some embodiments.

The second frame synchronization signal has one third pulse during a time period of at least one set of second pulses, each set of second pulses being composed of two adjacent second pulses, in the synchronization calibration signal. For example, referring to FIG. 6A, during the time period of a set of two adjacent second pulses M2 in the synchronization calibration signal Sync_eof, i.e., the time period between leading edges of two adjacent second pulses M2, the second frame synchronization signal VTG_Vsync has one third pulse M3. In this case, one frame of the second video signal may be output during a time period when one frame of the first video signal is input. For example, referring to FIG. 6B, during a time period when an input frame is A2, an output frame is A1. That is, during a time period when the input one frame of the first video signal is A2, the output one frame of the second video signal is A1, where A1 and A2 represent different video data, and A1 is a previous frame of video data of A2.

Figure 9A:
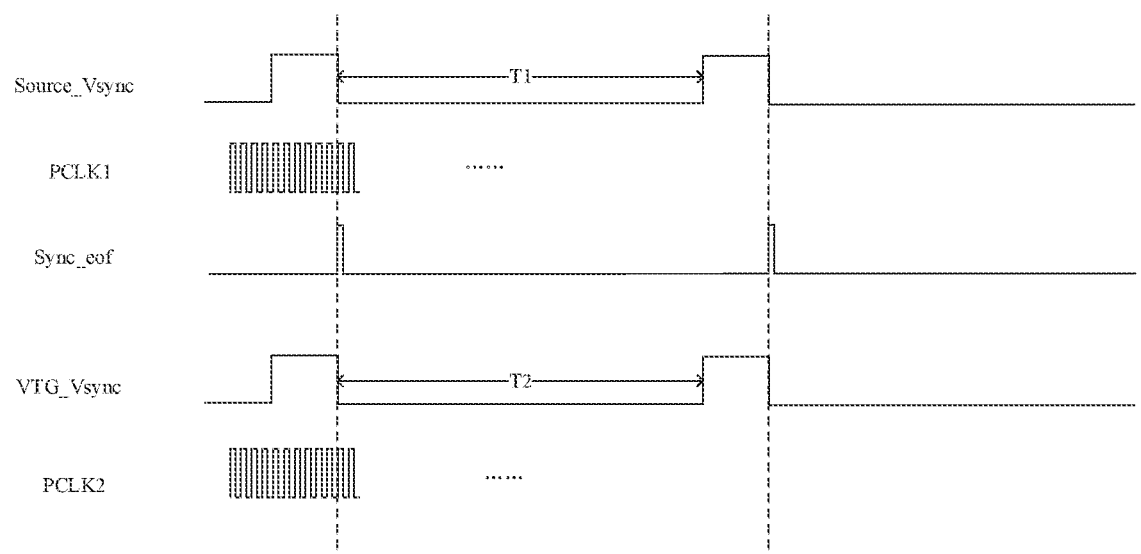
FIG. 9A is yet another signal timing diagram of a signal processing method, in accordance with some embodiments.
Figure 9B:
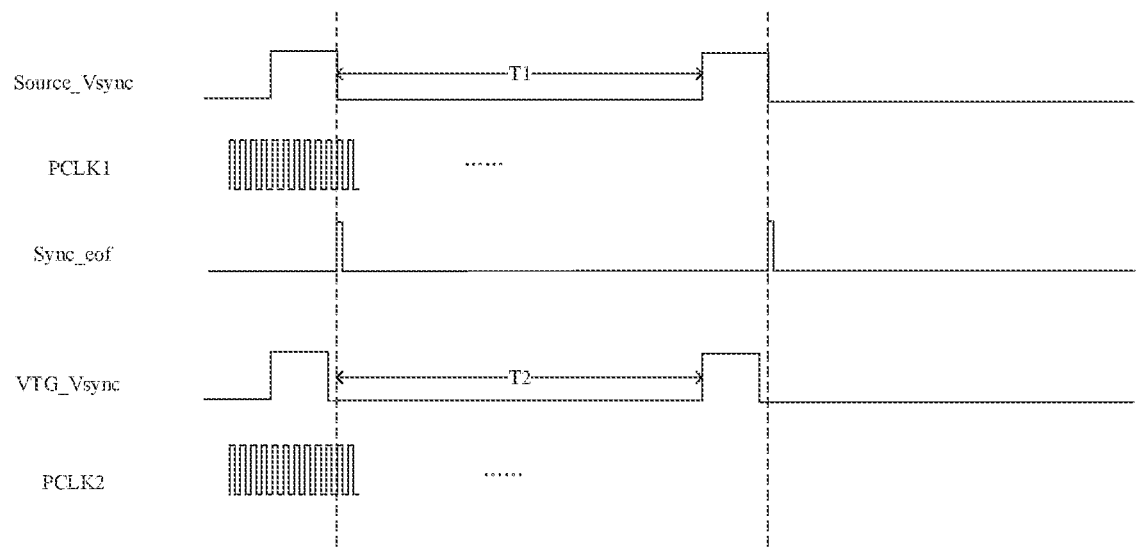
FIG. 9B is yet another signal timing diagram of a signal processing method, in accordance with some embodiments.

For example, the number of pulses of the second pixel clock signal corresponding to a pulse width of the third pulse is less than or equal to the number of pulses of the first pixel clock signal corresponding to the pulse width of the first pulse (referring to the first frame synchronization signal Source_Vsync and the second frame synchronization signal VTG_Vsync in FIGS. 9A and 9B). For example, during the time period of at least one set of second pulses, each set of second pulses being composed of two adjacent second pulses, in the synchronization calibration signal, the number of pulses of the second pixel clock signal corresponding to a time interval between a trigger edge of a second pulse and a leading edge of a third pulse closest to the second pulse after the second pulse is the first integer.

It will be understood that, for a third pulse in the second frame synchronization signal during the time period of at least one set of second pulses, each set of second pulses being composed of two adjacent second pulses, in the synchronization calibration signal, in a process of generating the third pulse, the number of pulses of the second pixel clock signal is counted from a moment of a leading edge of a former one of two adjacent second pulses, and if the number of pulses of the second pixel clock signal does not reach the second integer at a moment of arrival of the next second pulse of the synchronization calibration signal, the pulse width of the generated third pulse is smaller than the pulse width of the first pulse of the first frame synchronization signal. In this case, in a time period from the trailing edge of the third pulse to a leading edge of a second pulse closest to the third pulse after the third pulse, the second frame synchronization signal is at a low level, that is, the second frame synchronization signal is in a blanking phase. Or if the number of pulses of the second pixel clock signal reaches the second integer at the moment of the arrival of the next second pulse of the synchronization calibration signal, the pulse width of the generated third pulse is equal to the pulse width of the first pulse of the first frame synchronization signal.

In some embodiments, N times of the frequency of the first pixel clock signal is substantially equal to the frequency of the second pixel clock signal, where N is an integer greater than 1, for example, N is 2 or 3. For example, that N times of the frequency of the first pixel clock signal is substantially equal to the frequency of the second pixel clock signal may be understood as a ratio of N times of the frequency of the first pixel clock signal to the frequency of the second pixel clock signal is within a range of a second threshold. For example, the range of the second threshold is 0.9 to 1.1, and the second threshold may be 0.99, 0.999, 1 or 1.001. For example, the frequency of the first pixel clock signal is about 74.25 MHz, and the frequency of the second pixel clock signal is about 148.5 Hz. For example, the first frame rate of the first video signal is about 24 Hz, and the second frame rate corresponding to the display module is about 48 Hz; or the first frame rate of the first video signal is about 25 Hz, and the second frame rate corresponding to the display module is about 50 Hz; or the first frame rate of the first video signal is about 30 Hz, and the second frame rate corresponding to the display module is about 60 Hz.

Figure 7B:
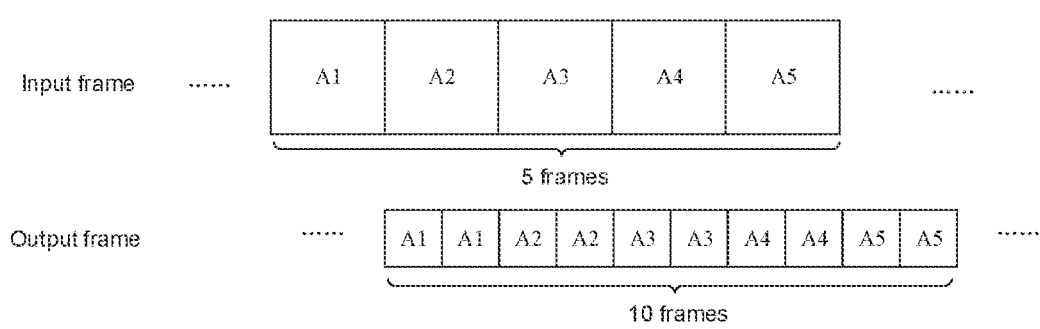
FIG. 7B is a diagram showing yet another transmission process of a video signal in a signal processing method, in accordance with some embodiments.

During the time period of at least one set of second pulses, each set of second pulses being composed of two adjacent second pulses, in the synchronization calibration signal, the second frame synchronization signal has N third pulses, and the N third pulses are adjacent. For example, N is 2. That is, the second frame synchronization signal has two third pulses during the time period of at least one set of second pulses, each set of second pulses being composed of two adjacent second pulses, in the synchronization calibration signal. For example, referring to FIG. 7A, during the time period of a set of two adjacent second pulses M2 in the synchronization calibration signal Sync_eof, that is, during the time period between leading edges of two adjacent second pulses M2, the second frame synchronization signal VTG_Vsync has two third pulses M3. In this case, two frames of the second video signals may be output during a time period when one frame of the first video signal is input. For example, referring to FIG. 7B, during a time period when the input frame is A2, the output frames are A1 and A1. That is, the output two frames of the second video signal are both A1 during the time period when the input one frame of the first video signal is A2.

Figure 10A:
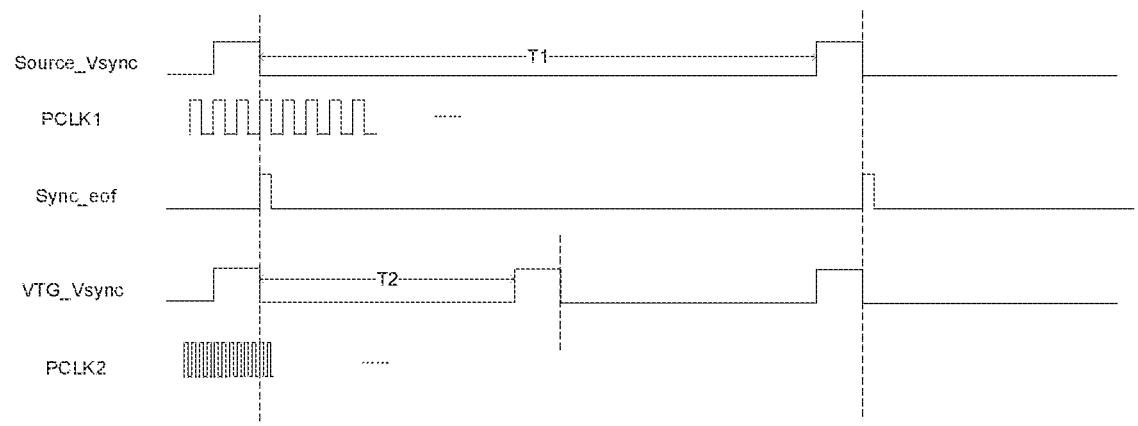
FIG. 10A is yet another signal timing diagram of a signal processing method, in accordance with some embodiments.
Figure 10B:
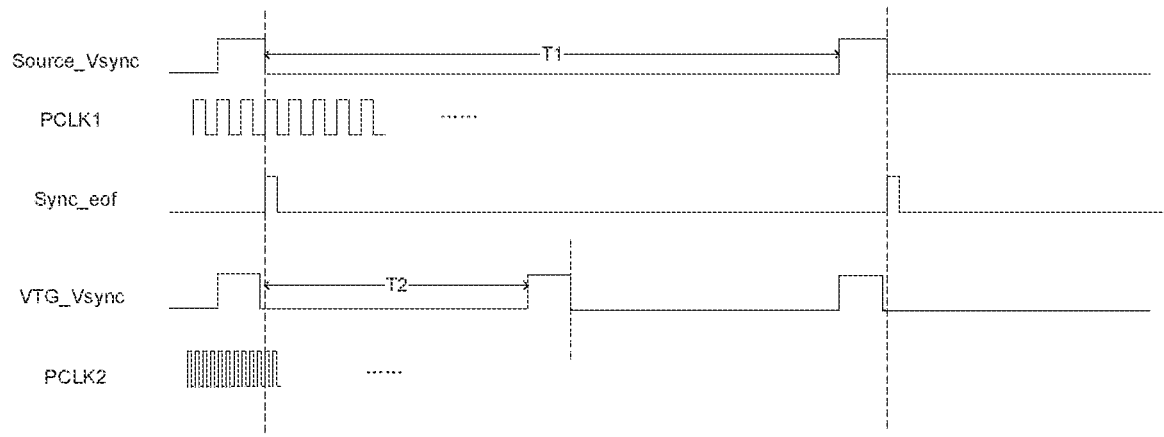
FIG. 10B is yet another signal timing diagram of a signal processing method, in accordance with some embodiments.

For example, the number of pulses of the second pixel clock signal corresponding to a pulse width of a former one of two third pulses is equal to the number of pulses of the first pixel clock signal corresponding to the pulse width of the first pulse. The number of pulses of the second pixel clock signal corresponding to a pulse width of the latter one of the two third pulses is less than or equal to the number of pulses of the first pixel clock signal corresponding to the pulse width of the first pulse (referring to the first frame synchronization signal Source_Vsync and the second frame synchronization signal VTG_Vsync in FIGS. 10A and 10B). The number of pulses of the second pixel clock signal corresponding to the pulse width of the third pulse is not necessarily an integer. For example, the pulse width of the former one of the two third pulses is greater than or equal to the pulse width of the latter one of the two third pulses.

For example, during the time period of at least one set of second pulses, each set of second pulses being composed of two adjacent second pulses, in the synchronization calibration signal, a time interval between a leading edge of the former one of the two third pulses and a leading edge of a second pulse closest to the former third pulse before the former third pulse corresponds to the first integer number of pulses of the second pixel clock signal, and the time interval between a trailing edge of the former one of the two third pulses and the leading edge of the second pulse closest to the former third pulse before the former third pulse corresponds to the second integer number of pulses of the second pixel clock signal.

For example, during the time period of at least one set of second pulses, each set of second pulses being composed of two adjacent second pulses, in the synchronization calibration signal, a time interval between a leading edge of the latter one of the two third pulses and the trailing edge of the former one of the two third pulses corresponds to the first integer number of pulses of the second pixel clock signal. That is, in the time interval between the leading edge of the latter one of the two third pulses and the trailing edge of the former one of the two third pulses, the number of pulses of the second pixel clock signal is the first integer.

It will be understood that, for the latter one of the two adjacent third pulses in the second frame synchronization signal during the time period of at least one set of second pulses, each set of second pulses being composed of two adjacent second pulses, in the synchronization calibration signal, in a process of generating the latter third pulse, the number of pulses of the second pixel clock signal is counted from a moment of the trailing edge of the former third pulse, and if the number of pulses of the second pixel clock signal does not reach the second integer at the moment of the arrival of the second pulse of the synchronization calibration signal, the number of pulses of the second pixel clock signal corresponding to the pulse width of the generated latter third pulse is less than the number of pulses of the first pixel clock signal corresponding to the pulse width of the first pulse of the first frame synchronization signal. In this case, in the time period from the trailing edge of the latter third pulse to the leading edge of the second pulse closest to the latter third pulse after the latter third pulse, the second frame synchronization signal is at a low level, that is, the second frame synchronization signal is in the blanking phase. Or if the number of the second pixel clock signal reaches the second integer at the moment of the arrival of the second pulse of the synchronization calibration signal, the number of pulses of the second pixel clock signal corresponding to the pulse width of the generated latter third pulse is equal to the number of pulses of the first pixel clock signal corresponding to the pulse width of the first pulse of the first frame synchronization signal.

Therefore, in the signal processing method provided in the embodiments of the present disclosure, the period between the trailing edge of the first pulse and the leading edge of the next first pulse in the obtained first frame synchronization signal is the first time period, and the first time period corresponds to the first integer number of pulses of the first pixel clock signal; the trigger edge of each second pulse in the generated synchronization calibration signal is at the same time as the trailing edge of the first pulse; and in the generated second frame synchronization signal, the period between the trigger edge of each second pulse and the leading edge of the third pulse closest to the second pulse after the second pulse is the second time period, and the second time corresponds to the first integer number of pulses of the second pixel clock signal. In this case, a period between the trailing edge of each first pulse (i.e., the trigger edge of the second pulse) and the leading edge of the third pulse closest to the first pulse after the first pulse remains unchanged in a cycle of each first pulse of the first frame synchronization signal through the synchronization calibration signal. In this way, it may be ensured that the second frame synchronization signal is synchronized with the first frame synchronization signal. For example, during a time period when one frame of video signal is input, one frame of video signal may be output, so that the input frame and the output frame may achieve single frame synchronization; or during the time period when one frame of video signal is input, two frames of video signals are output, so that the output frame may achieve double frame synchronization with respect to the input frame. In this case, it is possible to avoid a situation where a time delay of the input frame video signal and the output frame video signal of the signal processing device and a length of the time delay is continuously accumulated with the increase of the number of frames to result in frame skipping or a difference of at least one frame between the output frame and the input frame; and it is also possible to avoid a problem that output frames are not uniform. In this way, the accuracy of displayed images may be improved, and the authenticity of displayed images may also be improved.

In addition, the number of pulses of the second pixel clock signal may be counted from the trailing edge of the first pulse of the first frame synchronization signal to generate the third pulse of the second frame synchronization signal. In this way, the number of pulses of the second pixel clock signal corresponding to the pulse width of the third pulse of the second frame synchronization signal may be reduced, so that the trailing edge of the third pulse is not delayed from the trailing edge of the first pulse at an end of an input frame, thereby ensuring synchronization between the input frame and the output frame and improving a display effect.

In some embodiments, the signal processing method further includes: writing video data into the storage device; and reading the video data from the storage device to obtain the second video signal according to the second frame synchronization signal. The second video signal includes the second frame synchronization signal and the video data.

Figure 12:
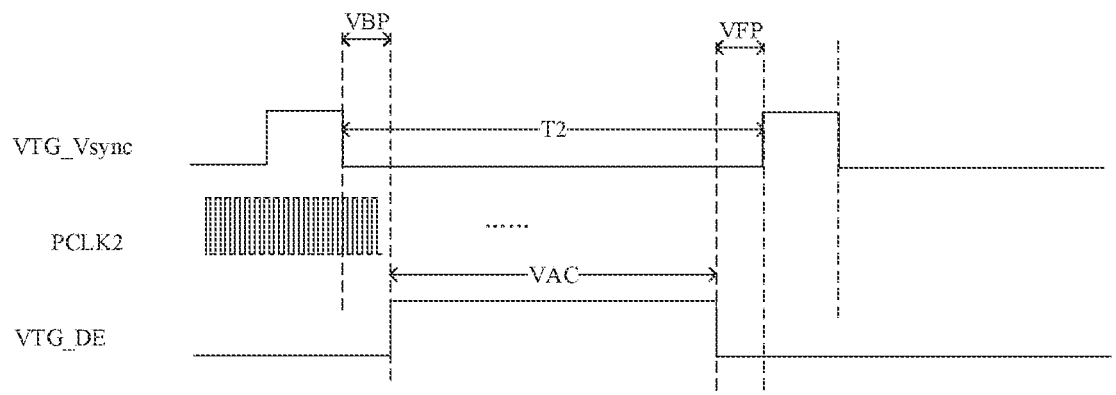
FIG. 12 is yet another signal timing diagram of a signal processing method, in accordance with some embodiments.

It will be understood that, a second enable signal VTG_DE (referring to FIG. 12) may be obtained according to the second frame synchronization signal, and the video data is read from the storage device to obtain the second video signal according to the second enable signal VTG_DE. For example, for a case where the frequency of the first pixel clock signal is equal to the frequency of the second pixel clock signal and the first frame rate of the first video signal is equal to the second frame rate of the display module, the signal processing device may output one frame of video signal (i.e., the second video signal) during a time period when the signal processing device receives one frame of video signal (i.e., the first video signal). For example, for a case where the frequency of the first pixel clock signal is less than the frequency of the second pixel clock signal and the first frame rate of the first video signal is less than the second frame rate of the display module, the signal processing device may output two frames of video signals (i.e., the second video signal) during a time period that the signal processing device receives one frame of video signal (i.e., the first video signal), and video data corresponding to the two frames of video signals are the same.

For example, a pulse width of the second enable signal VTG_DE is a duration of VAC. For example, in a counting cycle (VTT), in a case where the value of the row counter r_PCNT is greater than or equal to 1 and less than HAC, and the value of the column counter r_LCNT is greater than (VSW+VBP) and less than or equal to (VSW+VBP+VAC), the second enable signal VTG_DE is a high level signal. For example, a pulse width of a second horizontal synchronization signal is a duration of HSW, and the HSW represents an effective width of the pulse of the second horizontal synchronization signal. In a counting cycle (VTT), in a case where the value of the row counter r_PCNT is greater than (HAC+HFP) and less than or equal to (HAC+HFP+HSW), the second line synchronization signal is a high level signal, where HFP represents the number of pulses of the second pixel clock signal between a leading edge of a pulse of the second horizontal synchronization signal and a trailing edge of the second enable signal (a trailing edge of valid video data), and HAC represents the total number of pixels in a row of pixels in the display module. For example, the resolution of the display module is 1920×1080, the HAC is 1920, the HFP is 88, and the HSW is 44.

For example, the signal processing device may include a write controller (WDMA) and a read controller (e.g., RDMA). The write controller is used to control the video data to be written into the storage device, and the read controller is used to control the video data to be read from the storage device. The signal processing device may further include a read-write controller (e.g., MIG) and a bus arbiter (e.g., AXI Interconnect). The read-write controller may be used to control a timing of reading and writing video data to the storage device. For example, the read-write controller may be used to control a timing of writing video data into the storage device by the write controller, and control a timing of reading the video data from the storage device by the read controller, so as to avoid mutual interference between writing video data and reading video data. The bus arbiter may be used to enable the signal processing device to exchange data with the storage device through the bus arbiter.

In some embodiments, the signal processing method further includes: outputting the second video signal. It will be understood that, the signal processing device outputs the second video signal to the display module, and the display module may display an image corresponding to the second video signal. For example, the signal processing device may output the second video signal to the display module through a V-by-One (VBO), which is a high-definition digital display interface, and the signal processing device may include a VBO interface. For example, the display module includes the timing controller and the display panel, and the timing controller controls the display panel to display an image corresponding to the video data according to the second synchronization signal and the video data in the second video signal. During a time period when the signal processing device obtains one frame of the video signal, the video data in the video signal output by the signal processing device are video data in a previous frame of video signal of the input one frame of video signal.

It will be understood that, in a case where the first frame rate of the first video signal is within a range of the second frame rate of the display module, during the time period when the signal processing device obtains one frame of video signal, the signal processing device outputs one frame of video signal, so that the input frame and the output frame of the signal processing device may achieve single frame synchronization; in a case where N times of the first frame rate of the first video signal is within the range of the second frame rate of the display module, during the time period when the signal processing device obtains one frame of video signal, the signal processing device outputs N frames of video signals, so that the output frame of the signal processing device may achieve N frames synchronization with respect to the input frame of the signal processing device. In this case, it is possible to avoid unsynchronization of the input frame and the output frame, and it is also possible to avoid a situation where the time delay of the input frame video signal and the output frame video signal of the signal processing device and a length of the time delay is continuously accumulated with the increase of the number of frames to result in frame skipping or a difference of at least one frame between the output frame and the input frame. In this way, it is also possible to avoid an error occurs between the video signal output by the signal processing device to the display module and the video signal received by the signal processing device, and thus it is also possible to avoid a situation where the accuracy of the image displayed by the display module is reduced, and the authenticity of the displayed image is influenced.

In some embodiments, the signal processing method further includes: obtaining the first frame rate of the first video signal; and obtaining the range of the second frame rate of the display module. In a case where N times of the first frame rate is within the range of the second frame rate, the second frame synchronization signal has N third pulses during the time period of at least one set of second pulses, each set of second pulses being composed of two adjacent second pulses, in the synchronization calibration signal. N is an integer greater than 1. In a case where the first frame rate is within the range of the second frame rate, the second frame synchronization signal has one third pulse during the time period of at least one set of second pulses, each set of second pulses being composed of two adjacent second pulses, in the synchronization calibration signal.

It will be understood that in a case where N times of the first frame rate is within the range of the second frame rate, one input frame of the signal processing device corresponds to N output frames, which is in an N frame synchronization mode. In a case where 2 times (i.e., N is 2) of the first frame rate is within the range of the second frame rate, one input frame of the signal processing device corresponds to two output frames, which is in a double frame synchronization mode. In a case where the first frame rate is within the range of the second frame rate, one input frame of the signal processing device corresponds to one output frame, which is in a single frame synchronization mode. In this case, the signal processing device may generate different second frame synchronization signals by calling corresponding programs according to different first frame rates.

For example, the signal processing device further includes a frame rate detector, and the frame rate detector may obtain the first frame rate of the first video signal.

In addition, before the signal processing device starts to perform signal processing, the signal processing device may be reset (i.e., initialized) by a reset signal to avoid noise signal interference.

Figure 14:
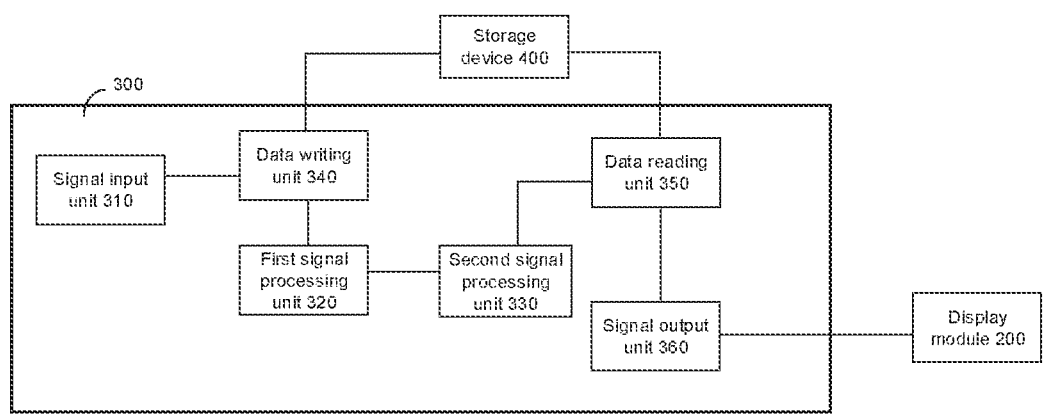
FIG. 14 is a structural diagram of yet another display apparatus, in accordance with some embodiments.

Embodiments of the present disclosure provide a signal processing device. The signal processing device may implement the signal processing method as described in any of the above embodiments. As shown in FIG. 14, the signal processing device 300 includes a signal input unit 310, a first signal processing unit 320 and a second signal processing unit 330.

The signal input unit is configured to obtain a first frame synchronization signal. The first frame synchronization signal includes a plurality of first pulses, a period between a trailing edge of a first pulse and a leading edge of a next first pulse is a first time period, and the first time period corresponds to the first integer number of pulses of the first pixel clock signal.

The first signal processing unit is configured to generate a synchronization calibration signal. The synchronization calibration signal includes a plurality of second pulses. A trigger edge of each second pulse is at the same time as the trailing edge of the first pulse. The trigger edge of the second pulse is a leading edge or a trailing edge of the second pulse, and a pulse width of the second pulse is equal to a pulse width of the first pixel clock signal or a pulse width of the second pixel clock signal.

The second signal processing unit is configured to generate a second frame synchronization signal. The second frame synchronization signal includes a plurality of third pulses. A period between the trigger edge of each second pulse and a leading edge of a third pulse closest to the second pulse after the second pulse is a second time period, and the second time period corresponds to a first integer number of pulses of the second pixel clock signal.

In some embodiments, the signal input unit is configured to obtain a first video signal. The first video signal includes a first frame synchronization signal and video data.

In some embodiments, as shown in FIG. 14, the signal processing device 300 further includes a data writing unit 340, a data reading unit 350 and a signal output unit 360. The data writing unit is configured to write the video data in the first video signal into a storage device. The data reading unit is configured to read the video data in the storage device according to the second frame synchronization signal. The signal output unit is configured to output a second video signal including the second frame synchronization signal and the video data.

For example, the embodiments of the apparatus described in FIG. 14 are merely exemplary. For example, division of the above units is merely a logical function division and there may be other divisions in an actual implementation. For example, a plurality of modules or components may be combined or may be integrated into another system, or some features may be omitted or not executed. The functional units in the embodiments of the present disclosure may be integrated into one processing module or may be separate physical units, or two or more units may be integrated into one module. The above units in FIG. 14 may be implemented in a form of hardware or software functional units. For example, when implemented in software, the first signal processing unit and the second signal processing unit may be implemented by a software functional module generated after at least one processor reads the program code stored in the memory. The above units in FIG. 14 may also be implemented by different hardware in a computer (a display apparatus). For example, the signal input unit, the first signal processing unit and the second signal processing unit are implemented by a part of processing resources in at least one processor (e.g., one core or two cores in a multi-core processor), while the data writing unit, the data reading unit and the signal output unit are implemented by another part of processing resources in at least one processor (e.g., other cores in the multi-core processor). For example, it is implemented in the form of hardware. For example, the above signal processing device may be a programmable device, such as a hardware programmable device, such as a field programmable gate array (FPGA). In this case, the first signal processing unit, the second signal processing unit, the signal input unit, the data writing unit, the data reading unit and the signal output unit in the signal processing device may each include a configurable logic module (CLB), and different units are coupled through internal connection lines. Obviously, the above functional units may also be implemented by means of a combination of software and hardware. For example, the signal input unit, the data writing unit, the data reading unit and the signal output unit are implemented by hardware circuits, while the first signal processing unit and the second signal processing unit are implemented by software functional modules generated after the CPU reads the program code stored in the memory.

For more details of the signal input unit 310, the first signal processing unit 320, the second signal processing unit 330, the data writing unit 340, the data reading unit 350 and the signal output unit 360 in FIG. 14 implementing the above functions, reference may be made to the descriptions in the previous method embodiments, which will not be repeated herein.

All the embodiments in the present description are described in an incremental manner. The same or similar parts among all the embodiments are referred to each other. Each embodiment focuses on differences between the embodiment and other embodiments.

The above embodiments may be implemented in whole or in part through software, hardware, firmware, or any combination thereof. When the above embodiments are implemented by using a software program, the software program may be implemented in form of a computer program product in whole or in part. The computer program product includes one or more computer instructions. When the computer instructions are loaded and executed on a computer, processes or functions according to the embodiments of the present disclosure are generated in whole or in part. The computer may be a general-purpose computer, a dedicated computer, a computer network, or other programmable devices. The computer instructions may be stored in a computer-readable storage medium. The computer readable storage medium may be any available medium that may be accessed by a computer, or a data storage device, such as a server including one or more available media, a data center including one or more available media, etc. The available medium may be a magnetic medium (e.g., a floppy disk, a hard disk, a magnetic tape), an optical medium (e.g., a digital versatile disk (DVD)), or a semiconductor medium (e.g., a solid state drive (SSD)), or the like.

It will be noted that beneficial effects of the above signal processing device are the same as the beneficial effects of the signal processing method as described in some of the above embodiments, which will not be repeated herein.

Some embodiments of the present disclosure provide a computer-readable storage medium (e.g., a non-transitory computer-readable storage medium). The computer-readable storage medium has stored therein computer program instructions. When run on a processor, the computer program instructions cause the processor to execute the signal processing method as described in any of the above embodiments, e.g., one or more steps in the signal processing method.

For example, the computer-readable storage medium may include, but is not limited to, a magnetic storage device (e.g., a hard disk, a floppy disk or a magnetic tape), an optical disk (e.g., a compact disk (CD), a DVD), a smart card or a flash memory (e.g., an erasable programmable read-only memory (EPROM), a card, a stick or a key driver). Various computer-readable storage media described in the embodiments of the present disclosure may represent one or more devices and/or other machine-readable storage media for storing information. The term "machine-readable storage media" may include, but are not limited to, wireless channels and various other media capable of storing, containing and/or carrying instructions and/or data.

Some embodiments of the present disclosure also provide a computer program product. The computer program product includes computer program instructions. When the computer program instructions are executed on a computer, the computer program instructions cause the computer to execute the signal processing method as described in the above embodiments, e.g., one or more steps in the signal processing method.

Some embodiments of the present disclosure also provide a computer program. When the computer program is executed on a computer, the computer program causes the computer to execute the signal processing method as described in the above embodiments, e.g., one or more steps in the signal processing method.

The computer-readable storage medium, the computer program product and the computer program have the same beneficial effects as the signal processing method as described in some embodiments of the present disclosure, which will be not described herein again.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A signal processing method, comprising:
    obtaining a first frame synchronization signal including a plurality of first pulses, wherein a period between a trailing edge of a first pulse and a leading edge of a next first pulse is a first time period, and the first time period corresponds to a first integer number of pulses of a first pixel clock signal;
    generating a synchronization calibration signal including a plurality of second pulses, wherein a trigger edge of each second pulse is at a same time as the trailing edge of the first pulse; the trigger edge of the second pulse is a leading edge or a trailing edge of the second pulse, and a pulse width of the second pulse is equal to a pulse width of the first pixel clock signal or a pulse width of a second pixel clock signal; and
    generating a second frame synchronization signal including a plurality of third pulses, wherein a period between the trigger edge of each second pulse and a leading edge of a third pulse closest to the second pulse after the second pulse is a second time period, and the second time period corresponds to a first integer number of pulses of the second pixel clock signal.

2. The signal processing method according to claim 1, wherein generating the second frame synchronization signal, includes:
    counting a number of pulses of the second pixel clock signal;
    generating the leading edge of a third pulse in the second frame synchronization signal when the number of pulses of the second pixel clock signal reaches the first integer; and
    generating a trailing edge of the third pulse in the second frame synchronization signal and returning to count the number of pulses of the second pixel clock signal in response to the trigger edge of the second pulse, before the number of pulses of the second pixel clock signal reaches a second integer, or generating the trailing edge of the third pulse in the second frame synchronization signal and returning to count the number of pulses of the second pixel clock signal in response to a case where the number of pulses of the second pixel clock signal reaches the second integer; and returning to count the number of pulses of the second pixel clock signal in response to the trigger edge of the second pulse.

3. The signal processing method according to claim 1 or 2, wherein generating the synchronization calibration signal, includes:
    obtaining a first signal, the first signal and the first frame synchronization signal being mutually inverted signals;
    obtaining a second signal, the second signal delaying one pulse width of the first pixel clock signal or the second pixel clock signal compared to the first frame synchronization signal; and
    obtaining the synchronization calibration signal according to the first signal and the second signal.

4. The signal processing method according to claim 3, wherein obtaining the synchronization calibration signal according to the first signal and the second signal, includes:
    performing logic operation on the first signal and the second signal to obtain the synchronization calibration signal.

5. The signal processing method according to claim 3 or 4, wherein obtaining the first signal, includes:
    inverting the first frame synchronization signal to obtain the first signal.

6. The signal processing method according to claim 1, wherein a frequency of the second pixel clock signal is substantially equal to a frequency of the first pixel clock signal; and
    the second frame synchronization signal has one third pulse during a time period of at least one set of second pulses, each set of second pulses being composed of two adjacent second pulses, in the synchronization calibration signal.

7. The signal processing method according to claim 6, wherein a number of pulses of the second pixel dock signal corresponding to a pulse width of the third pulse is less than or equal to a number of pulses of the first pixel clock signal corresponding to a pulse width of the first pulse.

8. The signal processing method according to claim 1, wherein N times of a frequency of the second first pixel clock signal is substantially equal to a frequency of the second pixel clock signal; and N is an integer greater than 1; and the second frame synchronization signal has N third pulses during a time period of at least one set of second pulses, each set of second pulses being composed of two adjacent second pulses, in the synchronization calibration signal.

9. The signal processing method according to claim 8, wherein N is 2;
the second frame synchronization signal has two third pulses during the time period of at least one set of second pulses, each set of second pulses being composed of two adjacent second pulses, in the synchronization calibration signal; and a number of pulses of the second pixel clock signal corresponding to a pulse width of a former one of the two third pulses is equal to a number of pulses of the first pixel clock signal corresponding to a pulse width of the first pulse; and
a number of pulses of the second pixel clock signal corresponding to a pulse width of a latter one of the two third pulses is less than or equal to the number of pulses of the first pixel clock signal corresponding to the pulse width of the first pulse.

10. The signal processing method according to claim 1, wherein obtaining the first frame synchronization signal, includes:
obtaining a first video signal including the first frame synchronization signal and video data; and
the signal processing method further includes:
writing the video data into a storage device; and
reading the video data from the storage device according to the second frame synchronization signal to obtain a second video signal including the second frame synchronization signal and the video data.

11. The signal processing method according to claim 10, further comprising:
outputting the second video signal.

12. The signal processing method according to claim 10 or 11, further comprising:
obtaining a first frame rate of the first video signal; and
obtaining a range of a second frame rate of a display module, wherein
N times of the first frame rate is within the range of the second frame rate, and the second frame synchronization signal has N third pulses during a time period of at least one set of second pulses, each set of second pulses being composed of two adjacent second pulses, in the synchronization calibration signal; and N is an integer greater than 1; or
the first frame rate is within the range of the second frame rate, and the second frame synchronization signal has one third pulse during the time period of at least one set of second pulses, each set of second pulses being composed of two adjacent second pulses, in the synchronization calibration signal.

13. A signal processing device, comprising:
a memory having stored therein one or more computer programs; and
a processor coupled to the memory, the processor being configured to execute the computer program, so that the processor implements the signal processing method according to claim 1.

14. A display apparatus, comprising:
a display module; and
the signal processing device according to claim 13, wherein the signal processing device is coupled to the display module, and the signal processing device is configured to output a second video signal to the display module.

15. The display apparatus according to claim 14, further comprising: a storage device coupled to the signal processing device, wherein
the storage device is configured to store video data in a first video signal.

16. A signal processing device, wherein the signal processing device is a chip, and the chip is configured to implement the signal processing method according to claim 1.

17. A display apparatus, comprising:
a display module; and
the signal processing device according to claim 15, wherein
the signal processing device is coupled to the display module, and the signal processing device is configured to output a second video signal to the display module.

18. A non-transitory computer-readable storage medium having stored a computer program, wherein the computer program causes a processor to implement the signal processing method according to claim 1 when run on a computer.

19. A signal processing device; comprising:
a signal input unit configured to obtain a first frame synchronization signal, wherein the first frame synchronization signal includes a plurality of first pulses, and a period between a trailing edge of a first pulse and a leading edge of a next first pulse is a first time period; and the first time period corresponds to a first integer number of pulses of a first pixel clock signal;
a first signal processing unit configured to generate a synchronization calibration signal, wherein the synchronization calibration signal includes a plurality of second pulses, and a trigger edge of each second pulse is at a same time as the trailing edge of the first pulse; and the trigger edge of the second pulse is a leading edge or a trailing edge of the second pulse, and a pulse width of the second pulse is equal to a pulse width of the first pixel clock signal or a pulse width of a second pixel clock signal; and
a second signal processing unit configured to generate a second frame synchronization signal, wherein the second frame synchronization signal includes a plurality of third pulses; and a period between the trigger edge of each second pulse and a leading edge of a third pulse closest to the second pulse after the second pulse is a second time period, and the second time period corresponds to a first integer number of pulses of the second pixel clock signal.

20. The signal processing device according to claim 19, wherein the signal input unit is configured to obtain a first video signal including the first frame synchronization signal and video data; and
the signal processing device further comprises:
a data writing unit configured to write the video data in the first video signal into a storage device;
a data reading unit configured to read the video data in the storage device according to the second frame synchronization signal; and
a signal output unit configured to output a second video signal including the second frame synchronization signal and the video data.

* * * * *

UNITED STATES PATENT AND TRADEMARK OFFICE
CERTIFICATE OF CORRECTION

PATENT NO. : 11,582,368 B2
APPLICATION NO. : 17/598952
DATED : February 14, 2023
INVENTOR(S) : Xitong Ma et al.

Page 1 of 1

It is certified that error appears in the above-identified patent and that said Letters Patent is hereby corrected as shown below:

In the Claims

In Claim 3, please replace [[claim 1 or 2]] with --claim 1--. (Column 22, Lines 28-29)

In Claim 5, please replace [[claim 3 or 4]] with --claim 3--. (Column 22, Lines 45-46)

In Claim 8, please replace [[the second first pixel clock signal]] with --the first pixel clock signal--. (Column 22, Lines 64-65)

In Claim 10, please remove the indentation between "includes:" and "obtaining,". (Column 23, Lines 25-26)

In Claim 12, please replace [[claim 10 or 11]] with --claim 10--. (Column 23, Lines 37-38)

Signed and Sealed this
Twenty-fifth Day of April, 2023

Katherine Kelly Vidal
*Director of the United States Patent and Trademark Office*